United States Patent
Chandra et al.

(10) Patent No.: US 9,553,640 B1
(45) Date of Patent: Jan. 24, 2017

(54) USING MULTI-FEED ANTENNAS

(71) Applicant: Microsoft Technology Licensing, LLC, Redmond, WA (US)

(72) Inventors: Ranveer Chandra, Kirkland, WA (US); Lopamudra Kundu, Raleigh, NC (US); Mike Nakahara, Kirkland, WA (US); Srihari Narlanka, Bellevue, WA (US); Gerald DeJean, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/978,728

(22) Filed: Dec. 22, 2015

(51) Int. Cl.
*H04B 7/04* (2006.01)
*H01Q 5/50* (2015.01)

(52) U.S. Cl.
CPC .............. *H04B 7/0417* (2013.01); *H01Q 5/50* (2015.01)

(58) Field of Classification Search
CPC ............... H04L 1/02; H04L 1/04; H04L 1/06; H04L 25/03891; H04L 25/03898; H03M 13/6306; H04B 7/02; H04B 7/0404; H04B 7/06; H04B 7/068; H04B 7/0408; H04B 7/0491; H04B 7/0417
USPC .................. 375/267, 299, 347–349
See application file for complete search history.

(56) References Cited

U.S. PATENT DOCUMENTS

| | | | | |
|---|---|---|---|---|
| 5,486,836 A | * | 1/1996 | Kuffner | H01Q 1/243 343/700 MS |
| 5,995,054 A | * | 11/1999 | Massey | H01Q 7/005 343/743 |
| 7,184,713 B2 | | 2/2007 | Kadous et al. | |
| 7,286,609 B2 | * | 10/2007 | Maltsev | H04W 52/346 375/130 |

(Continued)

FOREIGN PATENT DOCUMENTS

WO 2014165320 A2 10/2014

OTHER PUBLICATIONS

Frenzel, Louis E., "Dockon", Published on: Mar. 18, 2011 Available at: http://www.dockon.com/2011/03/today%E2%80%99s-antennas-tune-into-the-needs-of-modern-wireless-devices/.

(Continued)

*Primary Examiner* — Emmanuel Bayard
(74) *Attorney, Agent, or Firm* — Gregg Wisdom; Judy Yee; Micky Minhas

(57) ABSTRACT

Methods and devices for use with a multi-feed antenna used in a MIMO communication system are described herein. A method can include obtaining an antenna feed characteristic indicator associated with each of the feeds of the multi-feed antenna, and controlling how power is distributed among the feeds based on the antenna feed characteristic indicator associated with each of the feeds. An antenna feed characteristic indicator can be, e.g., an indicator of impedance matching, in which case power can be distributed among the feeds of the multi-feed antenna based on the indicators of impedance matching associate with each of the feeds. Power (Continued)

can also be distributed based on an indicator of link quality. Additionally, or alternatively, coding rate and/or modulation type can also be controlled for each of the feeds of the multi-feed antenna, based on one or more antenna feed characteristic indicators and/or one or more indicators of link quality.

20 Claims, 4 Drawing Sheets

(56) References Cited

U.S. PATENT DOCUMENTS

| | | | | |
|---|---|---|---|---|
| 7,920,640 B2* | 4/2011 | She | ............... | H04B 7/0413 375/267 |
| 7,920,889 B2* | 4/2011 | Hoshino | ............... | H04W 52/262 370/252 |
| 7,982,664 B1* | 7/2011 | Uscinowicz | ............... | G01S 7/4004 342/165 |
| 8,588,321 B2* | 11/2013 | Hoshino | ............... | H04B 7/0426 375/260 |
| 8,588,840 B2* | 11/2013 | Truong | ............... | H04W 52/46 370/252 |
| 8,717,244 B2 | 5/2014 | Joyce et al. | | |
| 8,775,078 B1* | 7/2014 | Luyks | ............... | G01C 21/00 455/575.9 |
| 8,805,300 B2 | 8/2014 | Alrabadi et al. | | |
| 8,891,657 B2* | 11/2014 | Medbo | ............... | H04W 52/241 375/267 |
| 8,918,135 B2* | 12/2014 | Park | ............... | H04W 52/146 370/252 |
| 9,130,640 B2* | 9/2015 | Qi | ............... | H04B 1/3833 |
| 2004/0141566 A1* | 7/2004 | Kim | ............... | H04B 7/0417 375/267 |
| 2005/0143027 A1 | 6/2005 | Hiddink et al. | | |
| 2005/0245204 A1* | 11/2005 | Vance | ............... | H01Q 1/243 455/80 |
| 2006/0222101 A1 | 10/2006 | Cetiner et al. | | |
| 2006/0281423 A1* | 12/2006 | Caimi | ............... | H01Q 9/045 455/129 |
| 2007/0241977 A1* | 10/2007 | Vance | ............... | H01Q 1/243 343/745 |
| 2008/0111748 A1* | 5/2008 | Dunn | ............... | H01Q 1/243 343/702 |
| 2009/0122847 A1 | 5/2009 | Nysen | | |
| 2012/0320869 A1 | 12/2012 | Stadelmeier et al. | | |
| 2013/0027254 A1 | 1/2013 | Korva et al. | | |
| 2013/0088404 A1 | 4/2013 | Ramachandran et al. | | |
| 2013/0122831 A1 | 5/2013 | Desclos et al. | | |
| 2013/0285873 A1 | 10/2013 | Dupuy et al. | | |
| 2014/0139218 A1 | 5/2014 | Findeklee et al. | | |
| 2014/0329473 A1 | 11/2014 | Kanj et al. | | |
| 2014/0329558 A1 | 11/2014 | Darnell et al. | | |
| 2015/0061840 A1* | 3/2015 | Butler | ............... | G06K 7/0008 340/10.51 |

OTHER PUBLICATIONS

Ikonen, et al., "Multi-feed RF front-Ends and Cellular Antennas for Next Generation Smartphones", In Technical Report of Researchgate, Jan. 2012, pp. 1-11.

* cited by examiner

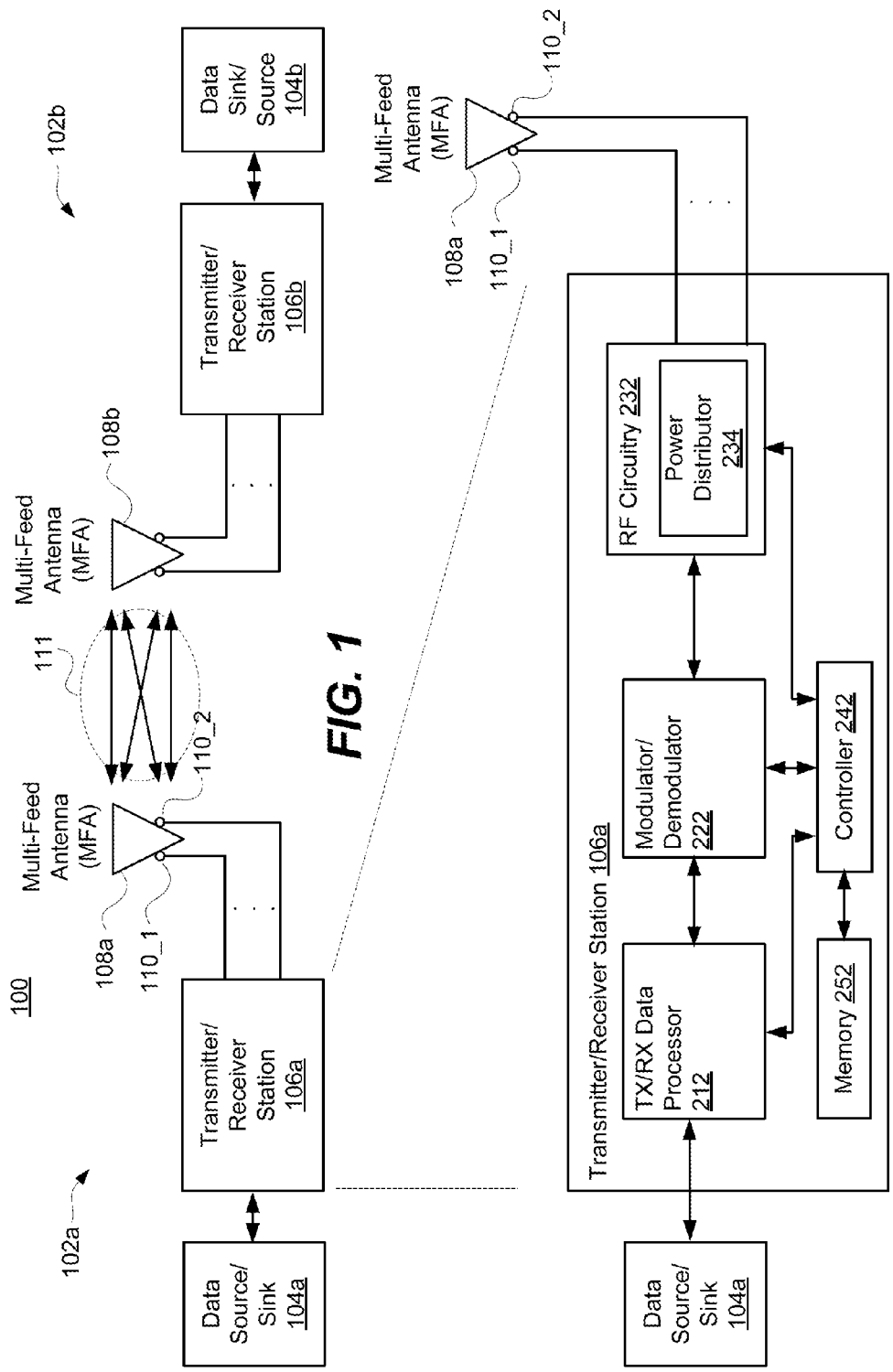

300

| Antenna Feed (frequ. Band 3) | | |
| Antenna Feed (frequ. Band 2) | | |
| Antenna Feed (freq. band 1) | 1st Characteristic Indicator | 2nd Characteristic Indicator |
| --- | --- | --- |
| 1 | 1-1 | 2-1 |
| 2 | 1-2 | 2-2 |
| ... | | |
| N | 1-N | 2-N |

400

| Antenna Feed (frequ. Band 3) | |
| Antenna Feed (frequ. Band 2) | |
| Antenna Feed (freq. band 1) | Impedance Matching Indicator (IMI) |
| --- | --- |
| 1 | IMI-1 |
| 2 | IMI-2 |
| ... | |
| N | IMI-N |

USING MULTI-FEED ANTENNAS

BACKGROUND

With the proliferation of wireless devices, there is a desire for faster and faster data rates. Single-input-single-output (SISO) communication technology can provide spectral efficiency up to only a certain limit, and beyond that, it becomes instrumental to use multiple-input-multiple-output (MIMO) communication technology to increase data rates and throughput. MIMO communication technology, which typically utilizes multiple independent antennas at both ends of a wireless communication link, is well known for increasing data rate of wireless channels without consuming additional bandwidth.

SUMMARY

Methods and devices for use with a multi-feed antenna used in a multi-input-multi-output (MIMO) communication system are described herein, wherein the multi-feed antenna includes two or more antenna feeds. In accordance with an embodiment, a method can include obtaining one or more antenna feed characteristic indicators associated with each of the feeds of the multi-feed antenna. Additionally, the method can also include controlling how power is distributed among the feeds of the multi-feed antenna based at least in part on at least one of the one or more antenna feed characteristic indicators associated with each of feeds of the multi-feed antenna. An antenna feed characteristic associated with each feed can be, e.g., an indicator of impedance matching, in which case power can be distributed among the feeds of the multi-feed antenna based on the indicator of impedance matching associated with each of the feeds. Power can additionally, or alternatively, be distributed based at least in part on an indicator of link quality associated with a wireless communication link supported by the multi-feed antenna. Additionally, or alternatively, coding rates and/or modulation types can be separately controlled for each of the feeds of the multi-feed antenna, based at least in part on one or more antenna feed characteristic indicators and/or one or more indicators of link quality, such that the coding rate and/or the modulation type differs for different feeds of the multi-feed antenna.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a high level block diagram of a MIMO communication system.

FIG. 2 is a block diagram illustrating exemplary details of one of the transmitter/receiver stations introduced in FIG. 1, according to an embodiment of the present technology.

DETAILED DESCRIPTION

Figures 3, 4, 5:
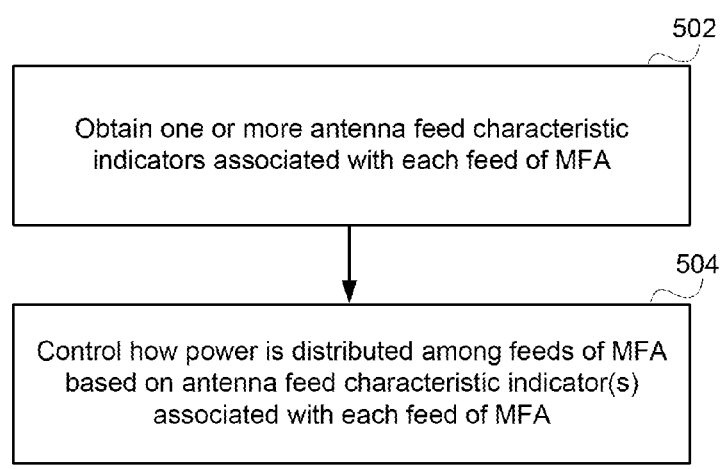
FIG. 3 is an example of a table that includes antenna feed characteristic indicators for multiple feeds of a multi-feed antenna.
FIG. 4 is an example of a table that includes an antenna feed impedance matching indicator for each of the feeds of a multi-feed antenna.
FIGS. 5 and 6 are high level flow diagrams that are used to summarize methods according to embodiments of the present technology that involve controlling how power is distributed among different feeds of a multi-feed antenna.

MIMO communication systems typically utilize multiple independent antennas at each end of a wireless communication link. More specifically, a first MIMO communication device (at a first end of a wireless communication link) is typically connected to two or more separate antennas that are used to transmit (and/or receive) wireless communication signals, and a second MIMO communication device (at a second end of the wireless communication link) is typically connected to two or more additional separate antennas that are used to receive (and/or transmit) wireless communication signals. However, the inclusion of multiple antennas in small devices is often difficult due to space constraints, and multiple antennas typically cost more to manufacture than a single antenna.

In accordance with certain embodiments of the present technology, rather than relying on multiple independent antennas to achieve the advantages of MIMO communication technology, single antennas including multiple antenna feeds are used. Such antennas are referred to herein as single element multi-feed antennas, or more succinctly as multi-feed antennas. Such multi-feed antennas can include two or more antenna feeds, which can also be referred to herein more succinctly as "feeds." The antenna feeds can also be referred as antenna ports, or more succinctly as "ports". Where a multi-feed antenna (MFA) includes exactly two antenna feeds, the MFA can be more specifically referred to as a dual-feed antenna (DFA). In other words, as the term multi-feed antenna (MFA) is used herein, this term encompasses a dual-feed antenna (DFA). Where the MFA includes more than two antenna feeds, the MFA can be more specifically referred to as an MFA including at least three feeds, an MFA including three or more feeds, or an MFA including more than two feeds. The separate feeds of an MFA are spatially separated from one another. To provide spatial multiplexing, each of the different feeds of an MFA can be fed a separate signal that is associated with a respective separate data stream. Alternatively, to provide transmit diversity, each of the different feeds of an MFA can be fed a separate signal that is associated with a same data stream.

With a single element multi-feed antenna (MFA), each of the feeds accesses the antenna as if an aperture includes multiple isolated antennas with unique radiation patterns. If designed judiciously, such a multi-feed antenna can be integrated in a limited space, thereby enabling the use of MIMO communication technology in small devices with stringent space constraints.

Where a MIMO communication device utilizes multiple independent antennas, each of the separate antennas (during transmission) can be fed with a separate signal, each of which can be associated with a respective separate data stream. In this manner, wireless signals associated with multiple separate data streams can be transmitted across a wireless communication link. Similarly, where a MIMO communication utilizes a single antenna having multiple antenna feeds (i.e., an MFA), each of the separate antenna feeds (during transmission) can be fed with a separate signal, each of which can be associated with a respective separate data stream. This similarly enables wireless signals associated with multiple separate data streams to be transmitted across a wireless communication link.

Where a MIMO communication device utilizes multiple independent antennas, each of the separate antennas can be designed to have optimal antenna matching, and the multiple antennas can be designed and spaced apart from one another to achieve optimal antenna isolation. However, where a MIMO communication device utilizes a single antenna having multiple antenna feeds (i.e., an MFA), it is much more difficult to achieve optimal matching and isolation for the multiple feeds.

In order to maximize power transfer it is desirable that the impedance of an antenna be perfectly matched to a predetermined impedance, which can be the impedance of a transmitter amplifier (e.g., a power amplifier) and/or transmission line that is coupled to the antenna. Further, it is desirable that the isolation between separate antennas (or separate antenna feeds of an MFA) be as large as possible, to minimize the coupling between the separate antennas (or between the separate antenna feeds of the MFA). It is noted that embodiments described herein are not intended to necessarily provide for the aforementioned maximized power transfer, perfect impedance matching, and minimized coupling.

An impedance matching indicator for each feed of an MFA that includes two feeds can be determined, for example, by using a vector network analyzer (VNA) to measure scattering parameters S11 and/or S22. Isolation of the two feeds can be determined, for example, by using a VNA to measure the scattering parameter S12 and/or S21. Scattering parameters, which are also known as S-parameters, describe the response of an N-port network to voltage signals at each port. For example, an MFA including two feeds can be treated as a 2-port network. With S-parameters, the first number refers to the responding port, while the second number refers to the incident port. Thus S12 means the response at port 1 due to a signal at port 2. S11 is referred to as the "forward reflection" coefficient, which is the signal leaving port 1 relative to the signal being injected into port 1. S22 is referred to as the "reverse reflection" coefficient, which is the signal leaving port 2 relative to the signal being injected into port 2. S11 and S22 can also be referred to as measures of return loss. S21 is referred to as the "forward transmission" coefficient, which is the signal leaving port 2 relative to the signal being injected into port 1. S12 is referred to as the "reverse transmission" coefficient, which is the signal leaving port 1 relative to the signal being injected into port 2. S21 and S12 can also be referred to as measures of isolation.

FIG. 1 is a high level block diagram of a MIMO communication system 100 that includes a first MIMO communication device 102a and a second MIMO communication device 102b. The first MIMO communication device 102a is shown as including a data source/sink 104a, a transmit/receive station 106a (which can also be referred to as a transceiver 106a or a radio 106a), and an MFA 108a. The MIMO communication device 102b is shown as including a data source/sink 104b, a transmit/receive station 106b (which can also be referred to as a transceiver 106b or a radio 106b), and an MFA 108b. Each of the MIMO communication devices 102a and 102b can also be referred to more generally as a wireless communication device, since they are capable of performing wireless communications. Each data source/sink 104 can be, e.g., a processor, or a network interface, but is not limited thereto.

The MIMO communication system 100 can be a full-duplex communication system where the first and second wireless communication devices 102a and 102b can transmit and receive signals simultaneously. The MIMO communication system 100 can alternatively be a half-duplex communication system where only one of the first and second wireless communication devices 102a and 102b can transmit signals at a time, during which time the other one of the wireless communication devices 102a and 102b receives the transmitted signals. While embodiments described herein can be used in both full-duplex and half-duplex systems, to simplify the discussion, for much of the remaining discussion the first wireless communication device 102a will be described as transmitting wireless signals to the second wireless communication device 102b. Nevertheless, it should be clear that the first wireless communication device 102a can also receive signals, and the second wireless communication device 102b can also transmit signals. The first and second wireless communication devices 102a and 102b, can be collectively referenced herein as wireless communication devices 102, or individually as a wireless communication device 102. It is also possible that a wireless communication device 102 can be designed to be capable of only one of transmitting or receiving wireless communication signals.

Still referring to FIG. 1, the MFA 108a is shown as including a first antenna feed 110_1 and a second antenna feed 110_2. The first and second antenna feeds 110_1 and 110_2 can be collectively referenced as the antenna feeds 110, or individually as an antenna feed 110. As noted above, each antenna feed 110 can be more succinctly referred to as a feed, or as a port. While FIG. 1 (and FIG. 2) show the MFA 108a as including only two antenna feeds 110, the MFA 108a can alternatively include more than two antenna feeds 110. For example, the MFA 108a can include three or four antenna feeds, but is not limited thereto. The MFA 108b can similarly include two or more antenna feeds. Where the MFA 108a includes exactly two antenna feeds, the MFA 108a can be more specifically referred to as a dual-feed antenna (DFA) 108a, as noted above. The MFAs 108a and 108b can be collectively referenced as the MFAs 108, or individually referenced as an MFA 108.

In FIG. 1 (and FIG. 2), the first MIMO communication device 102a is shown as including an MFA 108a, and the second MIMO communication device 102b is shown as including an MFA 108b. It would also be possible that only one of the MIMO communication devices 102a or 102b includes an MFA 108, while the other includes multiple independent antennas. For example, the MIMO communication device 102b can instead include two or more independent antennas. Embodiments of the present technology, described herein, are applicable so long as one of the MIMO communication devices 102 includes an MFA 108. Further, unless stated otherwise, it will be assumed that the first MIMO communication device 102a includes an MFA 108.

In accordance with an embodiment, in order for the first MIMO communication device 102a to transmit multiple data streams to the second transceiver system 102b, the data source/sink 104a provides a data stream to the transmitter/receiver station 106a, the transmitter/receiver station 106a separates the data stream into two (or more) data streams, and performs coding, modulation and RF up-conversion to generate a separate signal to provide to each of the antenna feeds 110 of the MFA 108a. For example, where the MFA 108a includes two antenna feeds 110_1 and 110_2, the transmitter/receiver station 106a can separate a data stream (received from the data source/sink 104a) into first and second data streams, from which first and second transmit signals are generated and provided to the first antenna feed 110_1 and the second antenna feed 110_2. In response to being provided with the first and second signals, the MFA 108a will transmit wireless RF signals associated with the two separate data streams across a wireless communication link 111 between the first and second wireless communication devices 102a and 102b. This would provide for spatial multiplexing. Alternatively, to provide for transmit diversity, the first and second transmit signals that are generated by the transmitter/receiver station 106a, and fed to the first antenna feed 110_1 and the second antenna feed 110_2, can include the same data.

For another example, where an MFA 108 includes three antenna feeds 110, the transmitter/receiver station 106 can separate a data stream (received from the data source/sink 104a) into three data streams, based upon which three generated signals are fed to the three antenna feeds 110. More generally, where an MFA 108 includes N antenna feeds 110, the transmitter/receiver station 106 can separate the data stream (received from the data source/sink 104) into N data streams, which can be used to generate N signals that are provided to the N antenna feeds 110 of the MFA 108, where N≥2. The N data streams can be N different data streams, which would provide for spatial multiplexing. Alternatively, the N data streams can be copies of the same data stream, which would provide for transmit diversity.

While embodiments described herein are also intended for use with an MFA 108 that include more than two antenna feeds 110, for much of the remaining description, each MFA 108 will often be described as having two feeds 110, to simplify the discussion. Nevertheless, one of ordinary skill in the art will appreciate from the description herein that the features described herein can be similarly used where an MFA 108 includes three or more antenna feeds 110.

Wireless communication systems typically operate in a designated frequency band. For example, wireless local area networks (WLANs) that are based on IEEE 802.11 standards, which are marketed under the Wi-Fi brand name, typically operate using one of five distinct frequency bands, which include the 2.4 GHz, 3.6 GHz, 4.9 GHz, 5 GHz, and 5.9 GHz bands, wherein each band (which can also be referred to as a frequency range) is divided into a multitude of channels. Countries apply their own regulations to the allowable channels, which specify, inter alia, maximum power levels within these frequency ranges. For example, in the United States, the Federal Communications Commission (FCC) is the regulatory agency that restricts transmit power levels for various frequency bands to facilitate efficient use of these frequency bands and to avoid excessive radio frequency (RF) interference. In other words, regulatory agencies may limit the total amount of power that can be transmitted in a wireless communication system, including, but not limited to, MIMO communication systems.

To conserve power and/or reduce potential interference with other systems, a wireless communication system may voluntarily operate below its regulated power limits, e.g., during periods of high link quality, which can be determined, e.g., based on a signal-to-noise ratio (SNR), a received signal strength indicator (RSSI), and/or bit-error rate (BER), or more generally, based on channel state information (CSI). For example, a WiFi system may periodically increase or reduce transmit power levels to maintain a guaranteed BER and/or SNR in a power efficient manner.

Where a MIMO communication system utilizes multiple independent antennas at each end of a wireless communication link, it is conventional to distribute power equally among each of the transmitting antennas. Similarly, where a single antenna includes multiple antenna feeds, as is the case with the MFA 108a shown in FIG. 1 (and FIG. 2), one option would be to always distribute power equally among the first and second feeds 110_1 and 110_2 of the transmitting MFA 108a. More specifically, where an MFA includes exactly two antenna feeds (and thus, is a DFA), the total power can be distributed among the two feeds 110 of the transmitting MFA 108 in accordance with the equation: $P_{total}=P_{feed1}+P_{feed2}$, where $P_{feed1}=W1*P_{total}$, $P_{feed2}=W2*P_{total}$, and weights W1 and W2 are the same, i.e., 0.5. More generally, where an MFA includes N antenna feeds, the weight $W_i$ that specifies the power distributed to each antenna feed of the transmitting MFA can be equally set to 1/N.

Alternatively, in accordance with specific embodiments of the present technology, antenna feed characteristic indicators and/or wireless communication link characteristic indicators can be taken into account to modify how power is distributed among the multiple (e.g., first and second) feeds of the transmitting MFA 108a. In such embodiments, more power can be distributed to one of the antenna feeds than to another one of the antenna feeds. Additional details of how such embodiments can be implemented are provided below. However, before providing such additional details, exemplary details of the transmitter/receiver station 106a, according to an embodiment, will first be described with reference to FIG. 2.

Referring to FIG. 2, the transmitter/receiver station 106a is shown as including a transmit (TX) and receive (RX) data processor 212, which can also be referred to as the TX/RX data processor 212, or more succinctly as a data processor 212. The data processor 212 can include, e.g., a demultiplexer, a multiplexer, one or more digital signal processor (DSP), but is not limited thereto. The DSP(s) of the data processor 212 can perform baseband processing, medium access control (MAC) layer processing and/or physical layer processing, which can involve selecting the MAC protocol to be used and/or physical layer protocol to be used. The DSP(s) can also separate data into packets, and add and remove MAC layer and physical layer packet headers. The data processor 212 can also control the timing of data packets, and thus, can including an oscillator and/or other timing circuitry, or such timing circuitry can be external to the data processor 212 and shared by other blocks of the transmitter/receiver station 106a.

The transmitter/receiver station 106a is also shown as including a modulator and demodulator 222 (which can also be referred to as the modulator/demodulator 222) and radio frequency (RF) circuitry 232, which could include a power distributor 234. Additionally, the transmitter/receiver station 106a is shown as including a controller 242 that is communicatively coupled to a memory 252. The controller 242 is also shown as being communicatively coupled to the data processor 212, the modulator/demodulator 222 and the RF circuitry 232. The controller 242 can be implemented in hardware, software, firmware, or a combination thereof. For example, the controller 242 can be implemented by a processor that executes program code instructions stored in the memory 252. The controller 242 can alternatively be implemented by an application specific integrated circuit (ASIC). Other variations are possible, and within the scope of the embodiments described herein. The memory 252 can provide storage for program code and/or data used by the controller 242. For a more specific example, the memory 252 can store antenna feed characteristic indicators associated with each of the feeds 110 of the MFA 108a. While shown as a single block in FIG. 2, the TX/RX data processor 212 can be separated into a TX data processor block and an RX data processor block. Similarly, the modulator/demodulator 222 can be separated into a modulator block and a demodulator block. Further, the RF circuitry 232 can be separated into a transmit RF circuitry block and a receive RF circuitry block. The power distributor 234 can be implemented, e.g., as an adjustable Wilkinson type power divider. More generally, the power distributor 234 can be implemented as an adjustable N-way power divider, where N is the number of antenna feeds of an MFA, and thus, is the number of ways a total specified transmit power level ($P_{total}$) is to be distributed among the N antenna feeds of the MFA 108.

In accordance with an embodiment, the MFA controller 242 that implements MFA control functionality can also be implemented in a control path, whereby its processing is not invoked on every data path. In such an implementation, MFA logic can make out of band decisions, such as the power ratio to apply on two (or more) feeds, and send the decisions to the power distributor 234.

During transmission, the data processor 212 can demultiplex (i.e., separate) data received from the data source/sink 104a into a number of data streams, and can further format, code, and interleave each data stream based on a coding scheme to provide a corresponding coded data stream. The coded data streams are then provided to the modulator portion of the modulator/demodulator 222. The modulator/demodulator 222 can include one or more DSP and/or other circuitry that can be perform orthogonal frequency-division multiplexing (OFDM), Fourier transforms and an inverse Fourier transforms, but is not limited thereto. For example, during transmission an OFDM symbol can be obtained by performing an inverse Fourier transform, e.g., an Inverse Fast Fourier Transform (IFFT), on a set of input symbols. During reception, the input symbols can be recovered by performing a Fourier transform, e.g., a fast Fourier transform (FFT), on the OFDM symbol. The FFT effectively multiplies an OFDM symbol by each of a plurality of subcarriers and integrates over a symbol period. The subcarriers can be modulated by QAM (Quadrature Amplitude Modulation) symbols, but other forms of modulation such as Phase Shift Keying (PSK) or Pulse Amplitude Modulation (PAM) can also be used. To reduce the effects of multipath, OFDM symbols can be extended by a guard period at the start of each symbol. Collectively, the data processor 212 and the modulator/demodulator 222 can implement a modulation and coding scheme (MCS) that is selected by the controller 242, wherein each different MCS index value provides a unique reference to a combination of the number of spatial streams, the modulation type and the coding rate. Where an MFA includes two antenna feeds 110, the MFA can be used to transmit up to two spatial streams. Where an MFA includes three antenna feeds 110, the MFA can be used to transmit up to three spatial streams. Where an MFA includes four antenna feeds 110, the MFA can be used to transmit up to four spatial streams. The coding rate is an indication of how much of a data stream is actually being used to transmit usable data, which is expressed as a fraction with the most efficient coding rate being ⅚ or 83.3% of the data stream being used. Besides ⅚, other exemplary coding rates include ½ and ¾, but are not limited thereto. The modulation type specifies the method by which a data stream is communicated through the air, wherein the more complex the modulation type, the higher the data rate. However, more complex modulation types typically require better channel conditions such as less interference and a good line of sight. Exemplary modulation types, listed from least complex to most complex, include binary phase-shift keying (BPSK), quadrature phase-shift keying (QPSK), 16-quadrature amplitude modulation (QAM), and 64-QAM, but are not limited thereto.

The RF circuitry 232 converts transmission symbol streams, received from the modulator/demodulator 222, into one or more analog signals and further conditions (e.g., amplifies, filters, and upconverts) the analog signals to generate analog signals that are provided to the various antenna feeds 110 of the MFA 108. Accordingly, the RF circuitry 232 can include one or more digital-to-analog converters (DACs), amplifiers, filters and/or upconverters, but is not limited thereto. The power distributor 234, which can be controlled by the controller 242, can be used to control how power is distributed among the multiple antenna feeds 110.

During reception, modulated RF signals are received by the MFA 108a, and the RF circuitry 232 conditions (e.g., filters, amplifies, and downconverts) the received signals and digitizes the conditioned signals to provide data samples for each received data stream. Accordingly, the RF circuitry 232 can include one or amplifiers, filters, downconverters and/or analog-to-digital converters (ADCs), but is not limited thereto. The sample streams from RF circuitry 232 are then provided to the modulator/demodulator 222, the demodulator portion of which recovers modulation symbols in accordance with one or more demodulation schemes complementary to the one or more modulation schemes used during transmission of the received signal. The data processor 212 then decodes the demodulated data to recover the transmitted data, which is provided to the data source/sink 104a.

The demodulator portion of the modulator/demodulator 222 can determine indicators of link quality (e.g., the channel response and noise variance) and provide these indicators of link quality to the controller 242. The data processor 212 may also determine the status of each received packet and may further provide one or more other indicators of link quality to the controller 242. More generally, indicators of link quality can be obtained and provided to the controller 242. Exemplary indicators of link quality can include, but are not limited to, signal to noise ratio (SNR), bit error rate (BER), soft error rate (SER), received signal strength indicator (RSSI), and received channel power indicator (RCPI). Other exemplary indicators of link quality include short-term channel state information (CSI) and long-term CSI. Further exemplary indicators of link quality, which can be determined or otherwise obtained by a transmitting wireless communication device on its own (e.g., in an open loop environment), or based on feedback received from the receiving wireless communication device (e.g., in a closed loop environment), include information about missed acknowledgements (ACKs), corrupt ACKs, over the air (OTA) antenna measurements, total radiated power (TRP), total isotropic sensitivity (TIS), capacity, radiation efficiency (ER), spectral efficiency, diversity gain, and received signal correlation.

As noted above, when utilizing an MFA 108, one option would be to always distribute power equally among the multiple feeds 110 of the MFA 108. In accordance with certain embodiments of the present technology, rather than distributing power equally among the multiple feeds 110 of the MFA 108, the power is instead distributed unequally, but in such a manner that a total specified transmit power level ($P_{total}$) is not exceeded. For example, referring to FIG. 2, where the MFA 108a is shown as including two antenna feeds 110_1 and 110_2, the power can be distributed in accordance with the equation: $P_{total} = P_{feed1} + P_{feed2}$, where $P_{feed1} = W1*P_{total}$, $P_{feed2} = W2*P_{total}$, and $W1 \neq W2$. The manner in which power is distributed can be based on antenna feed characteristic indicators that have been measured, a priori, and stored in memory 252, and/or based on antenna feed characteristic indicators that are measured and updated from time to time (e.g., periodically, or in response to a triggering event) and optionally stored in memory 252.

FIG. 3 is an example of a table 300 including antenna feed characteristic indicators for multiple feeds 110 of an MFA 108, which table can be stored in memory 252. Exemplary types of antenna feed characteristic indicators, which can be stored for each antenna feed 110 of an MFA 108, include, but are not limited to, one or more antenna feed impedance matching indicator (IMI), and one or more antenna feed isolation indicator (IsI). Each of the feeds of an MFA can have its own corresponding impedance matching network, in which case, the IMI for a feed can also be representative of the impedance matching network. Another exemplary antenna feed characteristic indicator is an antenna feed phase indicator (PI), which provides an indication of a phase delay that is caused when a signal is fed to a specific antenna feed of an MFA. Such antenna feed PIs can be useful, e.g., when performing beam steering by driving different feeds of an MFA with signals that are purposely out of phase with one another.

Exemplary impedance matching indicators (IMIs) include, but are not limited to, the forward reflection coefficient S11, matching efficiency (ME), and standing wave ratio (SWR). The standing wave ratio (SWR) is a measure of impedance matching of a load (e.g., an antenna feed 110) to the characteristic impedance of a transmission line. Radiation efficiency ($\epsilon_R$) is defined as the ratio of radiated power ($P_{radiated}$) radiated) and input power ($P_{input}$), i.e., $\epsilon_R = P_{radiated}/P_{input}$, which is a value between 0 and 1 that quantifies how efficiently an antenna feed can radiate power. The total radiation efficiency ($\epsilon_T$) of an antenna, however, falls short of $\epsilon_R$ due to impedance mismatch that causes a fraction of input power to a port to be reflected back from the port rather than getting radiated. More specifically, $\epsilon_T = ME*\epsilon_R$, where, ME is the matching efficiency (ME) when the antenna is connected to a transmission line. Both $\epsilon_R$ and $\epsilon_T$ can be measured directly, e.g., in a reverberation chamber. The matching efficiency (ME) is the ratio of $\epsilon_T$ to $\epsilon_R$ (i.e., $ME = \epsilon_T/\epsilon_R$), which is inversely proportional to the return loss (S11 and S22). Accordingly, the larger the ME, the more radiation efficiency and hence less return loss. An exemplary antenna feed isolation indicator (IsI) is the reverse transmission coefficient S12.

One or more such antenna feed IMI and/or antenna feed IsI can be determined for each antenna feed, e.g., in a factory, laboratory or testing facility, using measurement equipment, such as a VNA, and stored in the memory 252. Alternatively, one or more antenna feed characteristic indicators (e.g., an IMI) can be a surrogate measure of the antenna characteristic indicator (e.g., a surrogate measure of impedance matching) that is determined on-the-fly, during operation of the wireless communication device 102a. Since antenna feed characteristics may differ for different frequency bands, the table 300 may be multidimensional, as shown in FIG. 3, such that for each antenna feed a separate antenna feed characteristic indicator is stored for each of the different frequency bands with which the MFA may be used. An exemplary surrogate measure of impedance matching for an antenna feed is a measure of the load voltage across the output of a matching network that is connected to the antenna feed, wherein the better the matching the higher the load voltage. Measures of impedance matching can be static or adaptive. A static measure of impedance matching does not change over time, and thus, can be measured once after fabrication of an MFA, and can be used to select parameters and/or components of a matching network. However, in practice, antenna feed characteristics (including those that relate to impedance matching) may change with the near field perturbations, which necessarily change an antenna feed impedance Z11, and hence, S11 as well. To compensate for such changes, an antenna feed matching network that is connected to a feed may be adaptive. For example, an instantaneous load voltage across the output of a matching network can be measured and used to adjust parameters and/or components of the matching network.

FIG. 4 is an example of a table 400 that includes an antenna feed impedance matching indicator (IMI) for each of feed 110 of an MFA 108, which table can be stored in memory 252. Since impedance matching depends on the frequency band with which that MFA is being used (i.e., the frequency band at which that MFA operates), the table 400 is illustrated as a multidimensional table that stores a separate IMI for each feed, for each different frequency band with which the MFA may be used.

FIG. 5 is a high level flow diagram that is used to summarize a method according to certain embodiments of the present technology. The steps described with reference to FIG. 5 can be performed, e.g., by the controller 242 in FIG. 2. Referring to FIG. 5, step 502 involves obtaining one or more antenna feed characteristic indicators associated with each antenna feed of an MFA. An antenna feed characteristic indicator can be obtained from memory (e.g., 252), or more generally from a data storage device that can be memory (e.g., 252) or registers, where the antenna feed characteristic indicators have been measured at an earlier time. Alternatively, an antenna feed characteristic indicator can be obtained from on-the-fly measurement, which may or may not be stored in a data storage device (e.g., memory 252). Step 504 involves controlling how power is distributed among the antenna feeds of the MFA based on at least one of the one or more antenna feed characteristic indicators associated with each of the antenna feeds of the MFA. In accordance with certain embodiments, step 504 involves distributing more power to one of the antenna feeds of the MFA than to one or more other antenna feeds of the MFA. For example, where the MFA 108a includes the first and second antenna feeds 110_1 and 110_2, step 504 can involve distributing more power to the feed 110_1 than to the feed 110_2, or vice versa.

Indicators of impedance matching, whether determined a priori or on-the-fly, will provide an indication of which of the first and second antenna feeds has better impedance matching, and which of the first and second antenna feeds has worse impedance matching. It is noted that this may change depending upon the frequency band. For example, while the first antenna feed may have better impedance matching than the second antenna feed at 2.4 GHz, the first antenna feed may have worse impedance matching than the second antenna feed at 5 GHz.

Under certain conditions, e.g., while an indicator of link quality (e.g., SNR) is above a corresponding link quality threshold (e.g., an SNR threshold), step 504 can involve distributing more power to the one of the first and second antenna feeds 110_1, 110_2 having the worse impedance matching than to the one of the first and second antenna feeds 110_1, 110_2 having the better impedance matching. The feed 110 having the worse impedance matching can be, e.g., the feed 110 having the higher return loss (as measured by S11), or the lower mismatch loss (ML). Here, where the link quality (e.g., SNR) is relatively good, distributing more power to the worse matched antenna feed, which has a lower radiation capability, should boost an overall diversity signal strength.

Under other conditions, e.g., while the indicator of link quality (e.g., SNR) is below the corresponding link quality threshold (e.g., the SNR threshold), step 504 can involve distributing more power to the one of the first and second antenna feeds 110_1, 110_2 having the better impedance matching than to the one of the first and second antenna feeds 110_1, 110_2 having the worse impedance matching. The feed 110 having the better impedance matching can be, e.g., the feed 110 having the lower return loss (as measured by S11), or the lower mismatch efficiency (ME). Here, where the link quality (e.g., SNR) is relatively poor, distributing more power to the better matched antenna feed, which has a higher radiation capability, should boost the overall SNR. The controller 242 can use one or more algorithms and/or look-up-tables to determine how much power should be distributed to the various antenna feeds 110 of an MFA 108. For example, an algorithm or a look-up-table can be used to specify the weights W1 and W2 in the equation $P_{total} = P_{feed1} + P_{feed2}$, where $P_{feed1} = W1 \cdot P_{total}$, and $P_{feed2} = W2 \cdot P_{total}$. Antenna feed characteristic indicators and/or indicators of link quality can be used as variables in such an algorithm, or inputs to a look-up-table.

In accordance with certain embodiments, multiple link quality thresholds can be used to determine how to distribute power among the antenna feeds 110 of an MFA 108. For example, there can be a first (e.g., lower) link quality threshold and a second (e.g., higher) link quality threshold. When an obtained indicator of link quality (e.g., SNR) is below the first (e.g., lower) link quality threshold, more power can be distributed to the one of the first and second antenna feeds 110_1, 110_2 having the worse impedance matching than to the one of the first and second antenna feeds 110_1, 110_2 having the better impedance matching. When the obtained indicator of link quality (e.g., SNR) is above the second (e.g., higher) link quality threshold, more power can be distributed to the one of the first and second antenna feeds 110_1, 110_2 having the better impedance matching than to the one of the first and second antenna feeds 110_1, 110_2 having the worse impedance matching. When the obtained indicator of link quality (e.g., SNR) is between the first (e.g., lower) and the second (e.g., higher) link quality thresholds, power can be evenly distributed to the first and second antenna feeds 110_1, 110_2. The first and second link quality thresholds can be set to be the same, in which case the indicator of link quality (e.g., SNR) cannot be between the two thresholds. Other variations are also possible and within the scope of embodiments of the present technology described herein.

Figure 6:
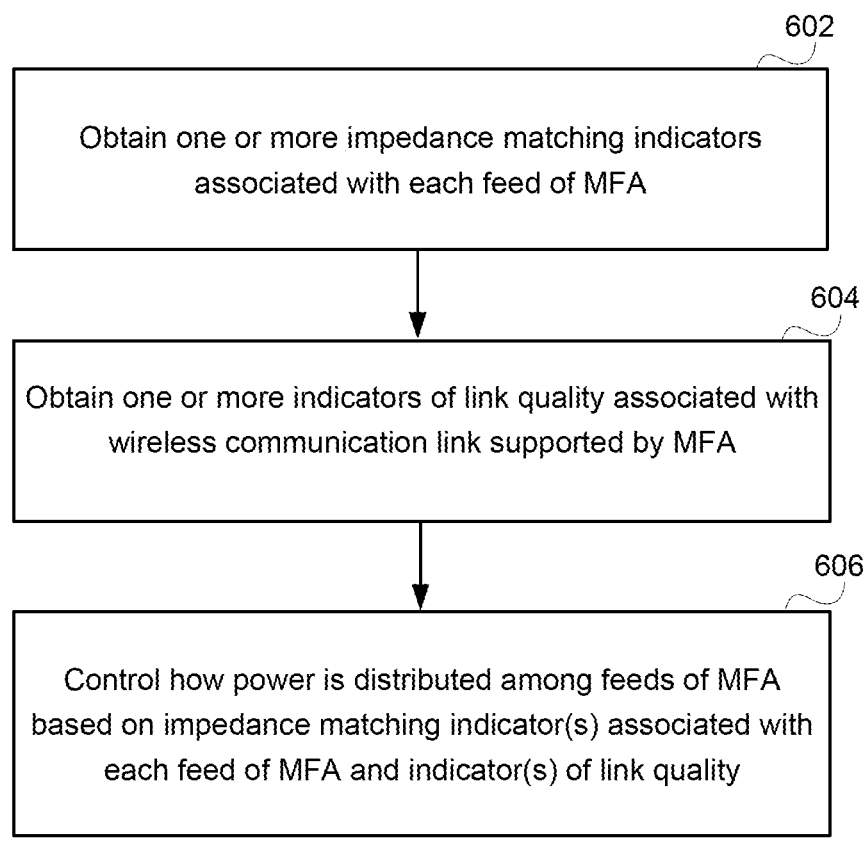

The above described embodiment is summarized with reference to the high level flow diagram of FIG. 6. Referring to FIG. 6, step 602 involves obtaining one or more impedance matching indictors (IMIs) for each feed of an MFA, step 604 involves obtaining one or more indicators of link quality (e.g., SNR), and step 606 involves controlling how power is distributed among the feeds of an MFA based on at least one of the one or more IMIs and based on at least one of the one or more indicators of link quality. The steps described with reference to FIG. 6 can be performed, e.g., by the controller 242 in FIG. 2.

In accordance with specific embodiments of the present technology, instead of, or in addition to, controlling how power is distributed to different antenna feeds of an MFA, different modulation and coding schemes (MCSs) can be used for different antenna feeds of the MFA. The MCS used for each antenna feed can be defined by an MCS index value. The more complex or higher (i.e., denser) the constellation modulation, the higher the data rate. Moreover, the denser the constellation, the more prone a signal is to bit error. Similarly, the higher the coding rate the less redundancy, and hence, the higher the data rate. However, the higher the coding rate, the more prone a signal is to noise, which can reduce the received SNR and lower the overall throughput. If a signal fed to an antenna feed with a lower radiation efficiency is modulated with a lower density constellation and coded with a lower rate code, then the signal would be more immune to noise, which in turn, can effectively increase the SNR. But again, the lower the MCS the lower the data rate. So a trade-off between data rate and SNR could dictate the MCSs that are selected for the different antenna feeds to increase overall throughput of the system.

Figure 7:
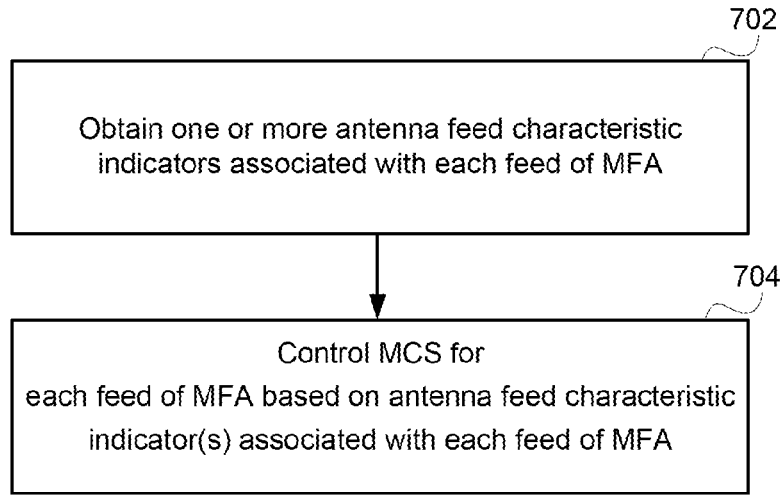
FIGS. 7 and 8 are high level flow diagrams that are used to summarize methods according to embodiments of the present technology that involve separately controlling coding rates and/or modulation types for different feeds of a multi-feed antenna.

The above described embodiment is summarized with reference to the high level flow diagram of FIG. 7. Referring to FIG. 7, step 702 involves obtaining one or more antenna feed characteristic indicators associated with each antenna feed of an MFA. Step 704 involves separately controlling the modulation and coding scheme (MCS) for each feed of the MFA, based on at least one of the one or more antenna feed characteristic indicators associated with each antenna feed of an MFA. More generally, step 704 can include selecting different coding rates and/or modulation types for different feeds of the MFA.

In accordance with a specific embodiment, step 702 can involve obtaining one or more impedance matching indictors (IMIs) for each feed of an MFA, and step 704 can involve separately controlling the MCS for each feed of the MFA based on at least one IMI associated with each feed of the MFA. As noted above, an IMI, whether determined a priori or on-the-fly, will provide an indication of which of the first and second antenna feeds has better impedance matching, and which of the first and second antenna feeds has worse impedance matching. As also noted above, this may change depending upon the frequency band.

Figure 8:
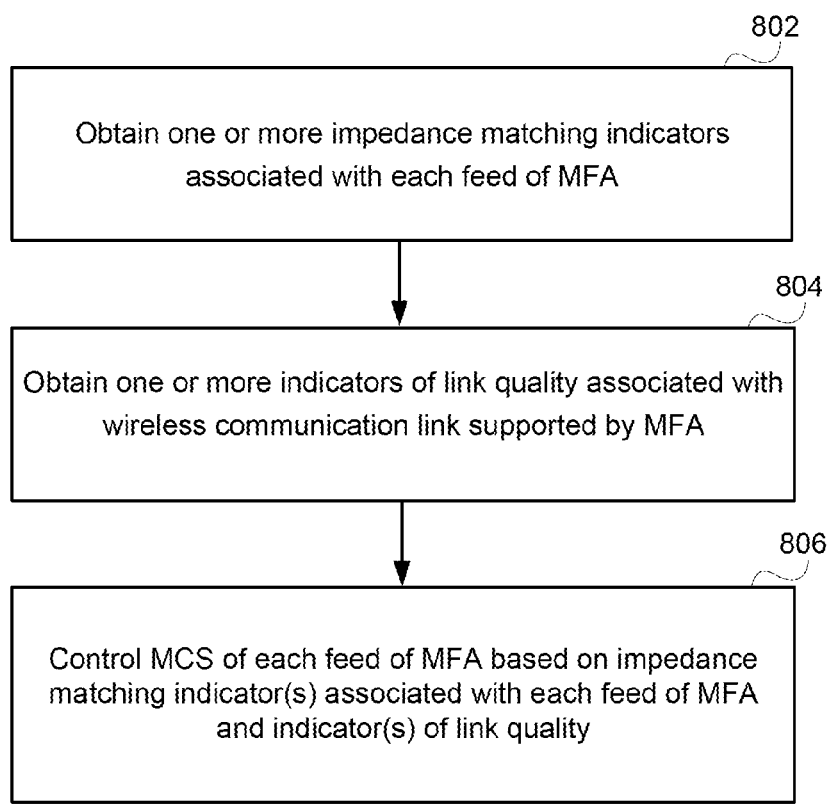

FIG. 8 is a high level flow diagram that summarizes another embodiment, where one or more indicators of link quality can also be taken into account when selecting MCS index values for the various feeds of an MFA. Referring to FIG. 8, step 802 involves obtaining one or more impedance matching indictors (IMIs) associated with each feed of an MFA, step 804 involves obtaining one or more indicators of link quality (e.g., SNR), and step 806 involves controlling the MCS for each feed of the MFA based on at least one of the one or more IMIs and based on at least one of the one or more indicators of link quality.

Under certain conditions, e.g., while an indicator of link quality (e.g., SNR) is above a corresponding link quality threshold (e.g., an SNR threshold), step 704 can involve using a higher MCS index value for the one of the first and second antenna feeds 110_1, 110_2 having the worse impedance matching than for the one of the first and second antenna feeds 110_1, 110_2 having the better impedance matching. Under other conditions, e.g., while the indicator of link quality (e.g., SNR) is below the corresponding link quality threshold (e.g., the SNR threshold), step 704 can involve using a higher MCS index value for the one of the first and second antenna feeds 110_1, 110_2 having the better impedance matching than for the one of the first and second antenna feeds 110_1, 110_2 having the worse impedance matching.

In accordance with certain embodiments, multiple link quality thresholds can be used to determine how to select separate MCS index values for separate antenna feeds 110 of an MFA 108. For example, there can be a first (e.g., lower) link quality threshold and a second (e.g., higher) link quality threshold. When an obtained indicator of link quality (e.g., SNR) is below the first (e.g., lower) link quality threshold, a higher MCS index value can be selected for the feed having the better impedance matching. When an obtained indicator of link quality (e.g., SNR) is above the second (e.g., higher) link quality threshold, a higher MCS index value can be used for the feed having the worse impedance matching. When the obtained indicator of link quality (e.g., SNR) is between the first (e.g., lower) and the second (e.g., higher) link quality thresholds, the same MCS index values can be used for multiple feeds. The first and second link quality thresholds can be set to be the same, in which case the indicator of link quality (e.g., SNR) cannot be between the two thresholds. Other variations are also possible and within the scope of embodiments of the present technology described herein.

The controller 242 can use one or more algorithms and/or look-up-tables to determine which MCS index values, or more generally, which coding rates and/or modulation types are to be used for the various antenna feeds 110 of an MFA 108. Other variations are also possible and within the scope of embodiments of the present technology described herein.

The embodiments described with reference to FIGS. 7 and 8 can be combined with the embodiments described with reference to FIGS. 5 and 6. For example, antenna feed characteristic indicators can be used to control how power is distributed among different feeds of an MFA, as well as to control the coding rates and/or modulation types for each of the feeds of the MFA. Further, indicators of link quality can also be taken into account when controlling the power distribution and the coding rates and/or modulation types selected for the different feeds. Unless stated otherwise, the term "based on", as used herein, means "based on least in part on", meaning that there can be additional and/or intervening factors that can also be taken into account.

In accordance with certain embodiments, one (or more) antenna feed(s) 110 of an MFA 108 can be disabled to improve performance of one or more other antenna feed(s) 110 of the MFA 108. Such an embodiment can involve, e.g., the controller 242 selectively disabling the antenna feed 110 having the worst impedance matching, when an indicator of link quality is below a corresponding link quality threshold.

Additionally, or alternatively, one (or more) antenna feed(s) 110 of an MFA 108 can be disabled to improve battery life, if a system is powered by a battery. Such an embodiment can involve, e.g., the controller 242 selectively disabling the antenna feed 110 having the worst impedance matching, when an indicator of link quality is below a corresponding link quality threshold.

In certain embodiments, different antenna feeds can be used for different applications. For example, one antenna feed of an MFA can be used to support a Bluetooth audio application, while another antenna feed of the same MFA can be used to support a Wi-Fi gaming application, wherein the different applications have different application requirements. In such embodiments, the controller 242 can selectively switch which application is being supported by which antenna feed, so that multiple different application requirements are supported. This can involve, e.g., using an antenna feed having the best impedance matching to support the application having higher MCS requirement, and using an antenna feed having the worst impedance matching to support the application having the lower MCS requirement. Additionally, or alternatively, depending on link quality, more (or less) power can be distributed to the antenna feed supporting the application having the higher MCS requirement, than to the antenna feed supporting the application having the lower MCS requirement. Other variations are also possible, and within the scope of the embodiments described herein.

While various embodiments of the subject matter of this application have been described above, it should be understood that they have been presented by way of example, and not limitation. It will be apparent to persons skilled in the relevant art that various changes in form and detail can be made therein without departing from the spirit and scope of the subject matter. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the subject matter of this application have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claims. One skilled in the art will recognize that these functional building blocks can be implemented by discrete components, application specific integrated circuits, processors executing appropriate software and the like or any combination thereof.

The breadth and scope of the present subject matter described herein should not be limited by any of the above-described exemplary embodiments, but should be defined only in accordance with the following claims and their equivalents.

What is claimed is:

1. A method for use with a multi-feed antenna used in a multi-input-multi-output (MIMO) communication system, wherein the multi-feed antenna includes at least a first feed and a second feed, the method comprising:

obtaining one or more antenna feed characteristic indicators associated with each of the first and second antenna feeds of the multi-feed antenna; and controlling how power is distributed among the first and second antenna feeds of the multi-feed antenna based at least in part on at least one of the one or more antenna feed characteristic indicators associated with each of the first and second antenna feeds of the multi-feed antenna;

wherein the controlling how power is distributed among the first and second antenna feeds of the multi-feed antenna comprises distributing at least some amount of power to each of the first and second antenna feeds, such that the amount of power distributed to each of the first and second antenna feeds differ from one another for at least a period of time.

2. The method of claim 1, wherein the controlling how power is distributed among the first and second antenna feeds of the multi-feed antenna comprises distributing more power to one of the of the first and second antenna feeds of the multi-feed antenna than to the other one of the first and second antenna feeds of the multi-feed antenna.

3. The method of claim 1, wherein:
the obtaining one or more antenna feed characteristic indicators associated with each of the first and second antenna feeds of the multi-feed antenna comprises obtaining an impedance matching indicator associated with the first antenna feed and an impedance matching indicator associated with the second antenna feed; and
the controlling how power is distributed among the first and second antenna feeds of the multi-feed antenna comprises controlling how power is distributed among the first and second antenna feeds of the multi-feed antenna based at least in part on the impedance matching indicators associated with the first and second antenna feeds.

4. The method of claim 3, wherein:
the impedance matching indicators associated with the first and second antenna feeds provide an indication of which of the first and second antenna feeds has better impedance matching, and which of the first and second antenna feeds has worse impedance matching; and
the controlling how power is distributed among the first and second antenna feeds of the multi-feed antenna comprises distributing more power to the one of the first and second antenna feeds of the multi-feed antenna that has the better impedance matching.

5. The method of claim 3, wherein:
the impedance matching indicators associated with the first and second antenna feeds provide an indication of which of the first and second antenna feeds has better impedance matching, and which of the first and second antenna feeds has worse impedance matching; and
the controlling how power is distributed among the first and second antenna feeds of the multi-feed antenna comprises distributing more power to the one of the first and second antenna feeds of the multi-feed antenna that has the worse impedance matching.

6. The method of claim 3, further comprising:
obtaining an indicator of link quality associated with a wireless communication link that is supported by the multi-feed antenna; and
the controlling how power is distributed among the first and second antenna feeds of the multi-feed antenna is also based at least in part on the indicator of link quality.

7. The method of claim 6, wherein the controlling how power is distributed among the first and second antenna feeds of the multi-feed antenna comprises:
distributing more power to the one of the first and second antenna feeds having the better impedance matching than to the one of the first and second antenna feeds having the worse impedance matching, while the indicator of link quality is below a first specified link quality threshold; and
distributing more power to the one of the first and second antenna feeds having the worse impedance matching than to the one of the first and second antenna feeds having the better impedance matching, while the indicator of link quality is above a second specified link quality threshold;
wherein the first and second specified link quality thresholds may or may not be the same.

8. The method of claim 1, further comprising:
separately controlling a first modulation and coding scheme (MCS) for the first antenna feed and a second MCS for the second antenna feed, based at least in part on at least one of the one or more antenna feed characteristic indicators associated with each of the first and second feeds of the multi-feed antenna, so that the first and second MCSs differ from one another.

9. The method of claim 1, wherein:
the multi-feed antenna also includes a third antenna feed;
the obtaining one or more antenna feed characteristics also includes obtaining one or more antenna feed characteristics associated with the third antenna feed; and
the controlling how power is distributed comprises controlling how power is distributed among the first, second and third antenna feeds of the multi-feed antenna based at least in part on at least one of the one or more antenna feed characteristic indicators associated with each of the first, second and third feeds of the multi-feed antenna.

10. The method of claim 9, further comprising:
obtaining an indicator of link quality associated with a wireless communication link that is supported by the multi-feed antenna; and
controlling first, second and third modulation and coding schemes (MCSs) for the first, second and third antenna feeds of the multi-feed antenna, based at least in part on the indicator of link quality, so that at least one of the first, second and third MCSs differs from another one of the first, second and third MCSs;
wherein the controlling how power is distributed among the first, second and third feeds of the multi-feed antenna is also based at least in part on the indicator of link quality.

11. A wireless communication device for use with a multi-feed antenna used in a multi-input-multi-output (MIMO) communication system, wherein the multi-feed antenna includes two or more antenna feeds, the device comprising:
a storage device that stores one or more antenna feed characteristic indicators associated with each antenna feed of a multi-feed antenna; and
a controller configured to control how power is distributed among the antenna feeds of the multi-feed antenna based at least in part on at least one of the one or more antenna feed characteristic indicators associated with each of the antenna feeds of the multi-feed antenna, such that each of the antenna feeds of the multi-feed antenna is distributing at least some amount of power, and such that different amounts of power are distributed to different ones of the antenna feeds of the multi-feed antenna for at least a period of time.

12. The wireless communication device of claim 11, wherein:
at least one of the one or more antenna feed characteristic indicators associated with each antenna feed of the multi-feed antenna, that is stored by the storage device, comprises an impedance matching indicator associated with each of the antenna feeds of the multi-feed antenna; and
the controller is configured to control how power is distributed among the antenna feeds of the MFA based at least in part on the impedance matching indicator associated with each of the antenna feeds of the MFA.

13. The wireless communication device of claim 11, wherein the controller is configured to control how power is distributed among the antenna feeds of the multi-feed antenna also based at least in part on an indicator of link quality associated with a wireless communication link that is supported by the multi-feed antenna.

14. The wireless communication device of claim 11, further comprising:
   a power distributor configured to distribute power among the different feeds of the MFA as controlled by the controller.

15. The wireless communication device of claim 11, wherein the controller is also configured to control at least one of a coding rate or a modulation type for each of the feeds of the multi-feed antenna based at least in part on at least one of the one or more antenna feed characteristic indicators associated with each of the feeds of the multi-feed antenna, such that at least one of the coding rate or the modulation type differs for different ones of the antenna feeds of the multi-feed antenna.

16. The wireless communication device of claim 11, wherein the controller is also configured to control at least one of a coding rate or a modulation type for each of the antenna feeds of the multi-feed antenna based at least in part on an indicator of link quality such that at least one of the coding rate or the modulation type differs for different antenna feeds of the multi-feed antenna.

17. The wireless communication device of claim 11, further comprising the multi-feed antenna that includes the multiple antenna feeds.

18. One or more processor readable storage devices having instructions encoded thereon which when executed cause one or more processors to perform a method for use with a multi-feed antenna including a plurality of antenna feeds, the method comprising:
   obtaining a respective antenna feed characteristic indicator for each of the antenna feeds of the multi-feed antenna; and
   controlling modulation and coding schemes (MCSs) for the plurality of antenna feeds, based at least in part on the respective antenna feed characteristic indicator obtained for each of the antenna feeds of the multi-feed antenna, such that the MCS for one of the antenna feeds differs from the MCS for another one of the antenna feeds.

19. The one or more processor readable storage devices of claim 18, wherein the method further comprises:
   controlling how power is distributed among the plurality of antenna feeds of the multi-feed antenna, based at least in part on the respective antenna feed characteristic indicator obtained for each of the antenna feeds of the multi-feed antenna, such that the power distributed to one of the antenna feeds differs from the power distributed to another one of the antenna feeds.

20. The one or more processor readable storage devices of claim 19, wherein the method further comprises:
   obtaining an indicator of link quality associated with a wireless communication link supported by the multi-feed antenna; and
   wherein at least one of the controlling the MCSs for the plurality of antenna feeds or the controlling how power is distributed among the plurality of antenna feeds is also based at least in part on the indicator of link quality.

* * * * *